United States Patent [19]

Jartoux

[11] Patent Number: 4,585,036
[45] Date of Patent: Apr. 29, 1986

[54] DISTRIBUTION ELEMENTS PLACED BETWEEN BINDINGS AND THE BODIES BOUND THEREBY

[75] Inventor: Pierre Jartoux, Epernon, France

[73] Assignee: Freyssinet International, Billancourt, France

[21] Appl. No.: 604,579

[22] Filed: Apr. 27, 1984

[30] Foreign Application Priority Data

May 3, 1983 [FR] France ................................ 83 07357

[51] Int. Cl.[4] ............................................. F16L 11/12
[52] U.S. Cl. .................... 138/172; 138/103; 138/106; 138/110; 138/176; 138/178; 138/DIG. 5; 24/545
[58] Field of Search ............... 138/103, 106, 110, 113, 138/134, 153, 172, 177, 178, 176, DIG. 5; 24/265 C, 562, 545; 248/49, 51, 55, 65; 52/224

[56] References Cited

U.S. PATENT DOCUMENTS

| | | | |
|---|---|---|---|
| 2,959,895 | 11/1960 | Caubet | 52/224 |
| 3,146,549 | 9/1964 | James | 138/176 X |
| 3,217,451 | 11/1965 | Closner | 138/176 X |
| 3,251,069 | 5/1966 | Clark | 24/545 X |
| 3,324,853 | 6/1967 | Czorny et al. | 24/545 X |
| 3,370,815 | 2/1968 | Opperthauser | 138/106 X |
| 3,377,757 | 4/1968 | Magers | 138/172 X |
| 3,521,644 | 7/1970 | Lamborn | 52/224 X |
| 3,961,647 | 6/1976 | Doubleday | 138/103 |
| 4,142,339 | 3/1979 | Crowley | 52/224 |

FOREIGN PATENT DOCUMENTS 1527160  5/1968  France ................................. 52/224

Primary Examiner—James E. Bryant, III
Attorney, Agent, or Firm—Larson and Taylor

[57] ABSTRACT

For distributing the pressure exerted by a binding cable (2), more especially contained in a sheath (10) with a grease filling, over a tubular body (1), such as a forced duct or a concrete silo, surrounded by this cable, there are inserted between said cable and said body shoes (3) formed by sections of a solid shaped bar of rubber which have the general shape of a C with constricted opening defining a cylindrical groove (4) adapted for jointingly receiving the cable and which are defined, on the side opposite the opening of the C, by a flat rectangular bearing face (6).

7 Claims, 3 Drawing Figures

DISTRIBUTION ELEMENTS PLACED BETWEEN BINDINGS AND THE BODIES BOUND THEREBY

The invention relates to the pressure distributing elements placed between the bindings and the bodies surrounded and reinforced by these bindings.

It relates more particularly to the case where the bindings in question are formed by tensioned metal cables, contained preferably with grease in sheaths made from a plastic material.

It is known to increase, by binding with cables, the resistance to bursting of certain tubular bodies intended to be subjected to high internal pressures such as forced ducts made from concrete or another material (metal . . . ) intended to transport fluids (water supplying hydraulic power stations in mountains, industrial gases . . . ) or such as cylindrical reservoirs or silos used for storing liquid or powdery products.

The cables or bindings considered are generally placed directly against the outer surface of the bodies to be reinforced.

This solution has the following drawback: the area of the cables applied against the body is extremely small so that the pressure for applying the binding is very high.

Unless the body reinforced with binding is especially hard and resistant to shearing and punching, these high application pressures may create fatigue lines in said body.

Furthermore, when the cables are sheathed, their sheaths risk being perforated or torn at some of their contact zones with the binding reinforced body not only because of the high pressures concentrated in these zones, which zones are often limited to practically linear, even pin point, zones but also because of possible mutual movements observed at the level of these zones between the bindings and the bound bodies, more especially during tensioning of these bindings.

To overcome this drawback, it has already been proposed to place strips or cushions between the bindings and the bodies to be reinforced. But the positioning of these cushions and holding them in place poses delicate problems.

It has also been proposed, with the same end in view, to thread beads onto the cables before they are positioned about the bodies to be reinforced. The positioning of the cables thus provided is certainly simplified, but threading the beads onto these cables is a long and delicate operation and this solution is relatively costly and inefficient since only a small portion of the beads contributes in actual fact to spreading out the binding pressures.

The aim of the invention is especially to overcome these different disadvantages.

For this, the pressure distributing elements of the invention are essentially characterized in that they are formed by sections of a solid shaped bar made from a resilient material having in cross section the general shape of a thick symmetrical C with constricted opening, the inner face of this C forming a groove extending along a circle of a diameter equal to that of the cables to be received, and the mutual spacing apart of the two lips of the C being slightly less than this diameter.

In preferred embodiments, recourse is further had to one and/or the other of the following arrangements:

that portion of the outer face of the shaped bar opposite the opening of the C is defined by a plane perpendicular to the plane of symmetry of this C, the flat face according to the preceding paragraph is connected to two other flat faces substantially perpendicular to the first one, each of the other two flat faces according to the preceding paragraph is connected to a lip by another flat face slanting with respect thereto through an angle between 30° and 60°, preferably of the order of 45°, each lip is defined by a rounded surface having the shape of a semi-circle in cross section, the distributing element is formed from a neoprene whose shore hardness is of the order of 95 to a 100, the distributing element is formed by cutting a shaped extruded bar.

The invention comprises, apart from these main arrangements, certain other arrangements which are used preferably at the same time and which will be more explicitly discussed hereafter.

In the following, a preferred embodiment of the invention will be described with reference to the accompanying drawings in a way which of course is in no wise limiting.

Figure 1:
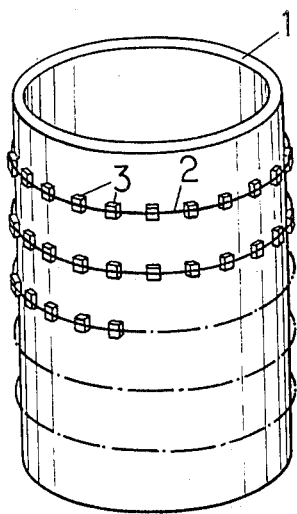
FIG. 1 shows in a lateral perspective view a forced duct section reinforced with a binding in accordance with the invention.

Duct 1 which it is desired to reinforce with binding in accordance with the invention is for example a forced duct made from reinforced concrete for transporting a stream of water in the mountains, more especially for feeding a turbine of a hydraulic power station or for forming a connection between the reservoir of a dam and a reserve on a higher level.

So as to reinforce the resistance of such a duct to bursting under the effect of high internal pressures generated by the water which it contains and/or transports, it is usual to surround it with bindings or cables 2 wound thereabout in the form of rings and tensioned.

So as to provide good distribution of the centripetal pressure forces exerted by these bindings 2 on the outer face of duct 1, in accordance with the invention, there is placed between said bindings and said face solid shoes 3 having two legs adapted to resiliently fit astride the bindings in question.

These shoes 3 are in the form of sections of a solid shape bar made from rubber or a similar material whose cross section is in the form of a thick C with a constricted opening admitting a plane of symmetry P.

The laterally opened groove 4 which is defined by this C has an inner face cylindrical in revolution whose diameter D is equal to or slightly less than the outer diameter of cables 2 which it is intended to receive jointingly.

The mutual spacing apart E of the two lips 5 defining the restricted opening of the shoe is less than the diameter D, the ratio E/D being advantageously between $\frac{1}{4}$ and $\frac{1}{2}$ and preferably of the order of $\frac{1}{3}$.

Thus, when each shoe is fitted over a cable its lips move slightly apart and snap to again immediately afterwards about the cable, in the manner of a "catch" as soon as the "hard point" is overshot corresponding to the passage of the thickest zone of the cable between these lips.

This arrangement has the triple advantage:

of great simplicity in fitting, of optimum automatic positioning of the cable at the bottom of its housing at the end of this fitting, and a certain irreversibility of the fitting in that each shoe cannot be separated from the cable on which it is fitted without voluntary external intervention.

The face 6, of shoe 3, opposite the opening of groove 4, which face is intended to bear directly against the body to be reinforced with the binding, is flat and perpendicular to plane P.

This face is separated from the bottom of groove 4 by a relatively large thickness F of rubber or other material forming the shoe.

Said face 6 is connected at right angles to two other flat faces 7 extending from this face 6 over a height H slightly less than the distance between said face 6 and the axis of groove 4.

The width L of face 6 is chosen so that the mass of rubber or similar material situated between the groove 4 and each of faces 7 has a relatively large thickness comparable to the above thickness F.

Each face 7 is itself connected to a lip 5 by a flat face 8 slanting through an angle between 30° and 60°, for example about 45° with respect to said face 7.

The outer surface of each lip 5 is rounded, its cross section being preferably defined outwardly by a semi-circle.

The length M of shoe 3 in the longitudinal direction of the shaped bar, that is to say the direction of the axis of groove 4 or that of the different lines of intersection between the flat faces 6, 7 and 8 is preferably of the same order of size as width L.

But this length M could be much greater and the shoes could even form a sort of practically continuous sleeve extending along at least the greatest part of the bindings.

Finally, the shoe has the general shape of a prismatic block having the appearance of a small house whose ridge would be replaced by a cylindrical relatively deep and wide groove with a horizontal axis.

The material forming the shoe must be sufficiently deformable for its rectangular face 6, which forms the bearing face of the shoe against the outer cylindrical face of body 1, to mate jointingly with this cylindrical face and sufficiently hard to avoid any shearing by the cable.

This material is for example synthetic rubber known under the name of neoprene and having a shore hardness of the order of 95 to 100. The scale adopted for the shore hardness of Neoprene is Shore A according ASTM D 2240 Rule.

But any other elastomer or plastic material having the required qualities of deformability, resilience and resistance could be used.

Figure 2:
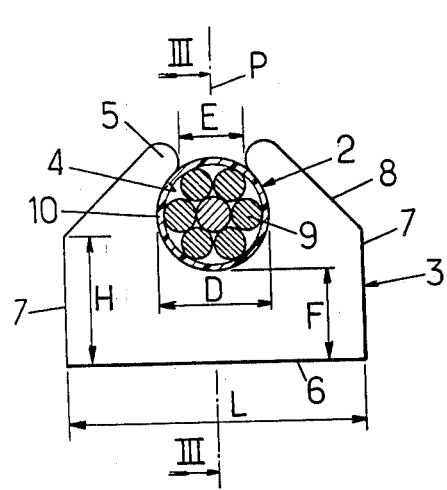
FIG. 2 shows on a larger scale an end view of one of the pressure distributing shoes of the invention placed between the above forced duct and one of its reinforcing bindings, said shoe supporting a sheathed cable forming said binding.
Figure 3:
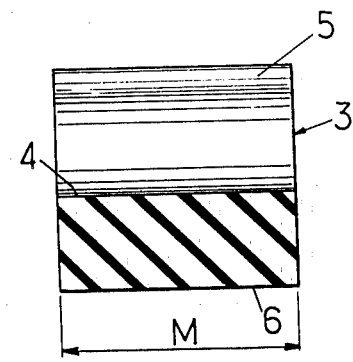
FIG. 3 shows the same shoe in a section through III—III, of FIG. 2 but without the sheathed cable.

In the preferred applications, cables 2 forming the bindings are formed by filaments or strands 9 (FIG. 2) contained in sheaths 10 made from a plastic material with interpositioning of a grease filling.

With such an arrangement, said filaments or strands may be protected from dampness, which is especially important in the case mentioned above of strengthening by binding a forced duct in the mountains, since the external face of the duct is subjected to trickling water.

The adoption of the pressure distribution shoes of the invention is particularly advantageous when the binding is formed by means of such sheathed cables since it avoids risks of local tearing of the sheaths due to the local concentrations of the binding pressure.

In one embodiment of the invention having given every satisfaction and indicated purely by way of illustration, with a binding cable 2 having a diameter of 18 mm, the following dimensions were adopted for the shoes: D=18 mm, E=12 mm, F=14 mm, H=21 mm, L=50 mm and M=40 mm.

The average spacing between the different shoes along each binding was of the order of 15 to 20 cm and the mutual spacing part of the different bindings was of the order of 10 cm.

But of course any other dimensions and spacings for the shoes could also be contemplated, depending on the internal pressures of the works to be reinforced, said shoes being for example spaced apart so as to form square meshes and then having indentical spacings not only in the longitudinal direction of duct 1 but also in its peripheral direction.

For manufacturing the above shoes, it is advantageous to cut up a shaped bar formed by extrusion through an appropriate die.

But other desirable processes such as molding could also be adopted.

Following which and what ever the embodiment adopted, binding shoes are finally obtained whose construction follows sufficiently from the foregoing.

These shoes have numerous advantages with respect to these known heretofore and in particular the following:

each shoe can be fitted in a very simple way to the corresponding cable by snap fitting this shoe astride this cable, the lips of the shoe opening resiliently elastically to allow the cable to pass therethrough and closing again subsequently automatically and immediately about the positioned cable, this automatic closing perfectly finishes the positioning of the cable at the bottom of the groove of the shoe, it further confers on the fitting obtained a character which though not totally irreversible, is at leat of the "secure" type, that is to say in which the shoes can no longer be "lost" or separated involuntarily from the cables to which they are fitted, the positioning of the cables thus equipped previously with their shoes about the body to be reinforced is then extremely easy since it is sufficient to orientate their bearing faces 6 towards said body, because of the deformability of the material forming each shoe, its hardness and the large area of its rectangular bearing face 6, this latter is applied exactly to the outer face of the body 1 to be reinforced, during positioning of the binding on this body and tensioning thereof, which considerably reduces the specific pressure of the binding reinforcement for a given efficiency thereof and ensures excellent and durable distribution of this binding pressure.

As is evident, and as it follows moreover already from what has gone before, the invention is in no wise limited to those of its modes of application and embodiments which have been more especially considered; it embraces on the contrary, all variants thereof, particularly those in which the inner face of the C defining the general shape of the cross section of the shaped bar section is not strictly circular, at least before positioning of this shaped bar section on the corresponding cable, said cross section being able more especially to be chosen so as to cause the C to close automatically and resiliently after said positioning.

I claim:

1. A reinforced structure comprising;

a tubular body, a tensioned binding cable extending circumferentially around the body and exerting a reinforcing force against the exterior surface of the body, a plurality of pressure distributing elements interposed between the cable and the body to distribute said reinforcing force exerted by the cable on the body, each element formed as a solid bar of resilient material, said bar having an outer face located against the outer surface of the body, the resiliency of the material allowing the bar to form to the shape of the exterior surface of the body, the cross section of the bar, transverse to the cable, having a shape of a thick symmetrical C with a constricted opening, the base of the C forming said outer face, and the interior of the C forming a groove which receives the cable and which lies on a circle, the diameter of which circle is generally equal to the diameter of the cable, and wherein the opening into the groove between the spaced apart lips of the C is slightly less than the diameter of the cable, the resiliency of the material being sufficient to permit the lips to separate elastically to receive the cable and to elastically return against the cable.

2. The structure according to claim 1 characterized in that a portion of the outer face of the shaped bar opposite the opening of the C is defined by a flat face (6) perpendicular to a plane of symmetry (P) of this C.

3. The structure according to claim 2, characterized in that the flat face (6) is connected to two other flat faces (7) substantially perpendicular to the first one.

4. The structure according to claim 3, characterized in that each of the other two flat faces (7) is connected to a lip (5) by another flat face (8) slanting with respect thereto by an angle between 30° and 60°, preferably of the order of 45°.

5. The structure according to claim 1, characterized in that each lip (5) is defined by a rounded surface having the shape of a semi-circle in cross section.

6. The structure according to claim 1, characterized in that at least one element is formed from a neoprene whose Shore A hardness is of the order of 95 to 100.

7. The structure according to claim 1, characterized in that each element is formed by cutting up an extruded shaped bar.

* * * * *

UNITED STATES PATENT AND TRADEMARK OFFICE
CERTIFICATE OF CORRECTION

PATENT NO.  : 4,585,036
DATED       : April 29, 1986
INVENTOR(S) : Pierre Jartoux It is certified that error appears in the above-identified patent and that said Letters Patent is hereby corrected as shown below:

On the cover page, please change the name of the assignee to read as follows:

FREYSSINET INTERNATIONAL (STUP),
BOULOGNE BILLANCOURT, FRANCE

Signed and Sealed this

Tenth Day of March, 1987

Attest:

DONALD J. QUIGG

Attesting Officer

Commissioner of Patents and Trademarks